May 3, 1938.  W. C. HEDGCOCK  2,115,989
ROLLER BEARING UNIT FOR FREIGHT CARS
Filed March 25, 1935   2 Sheets-Sheet 1
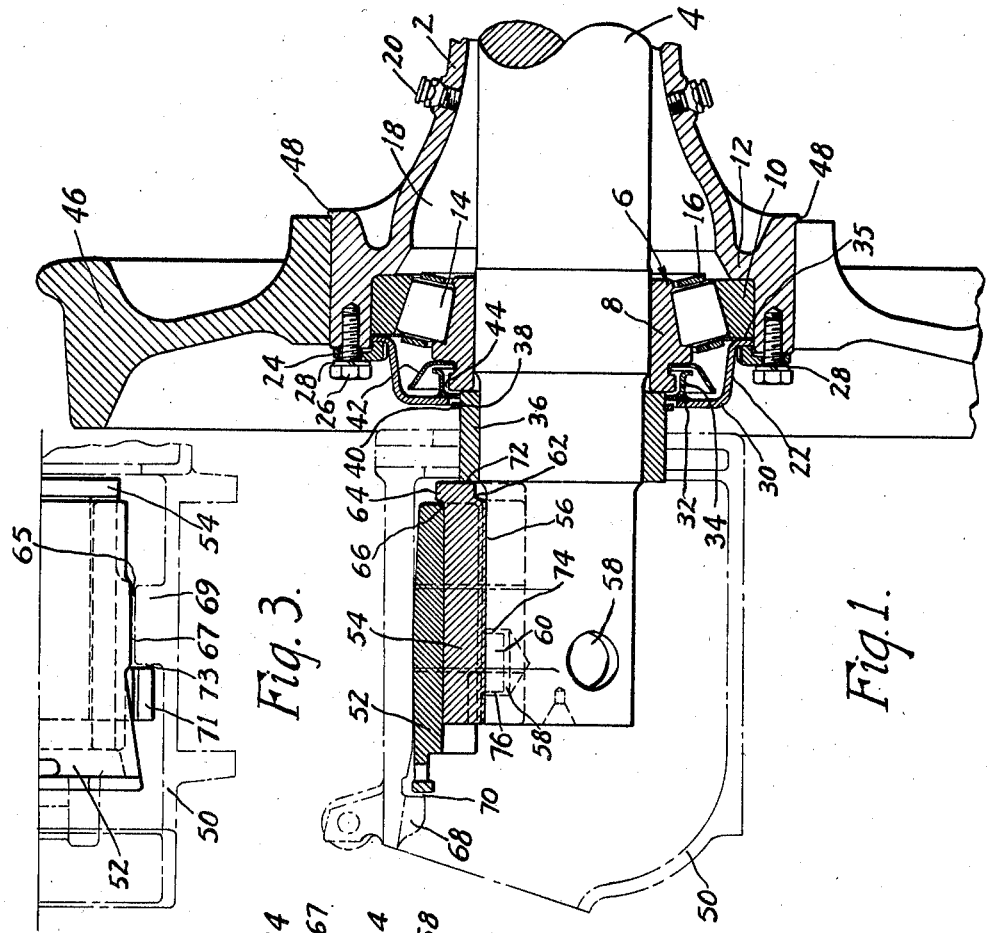
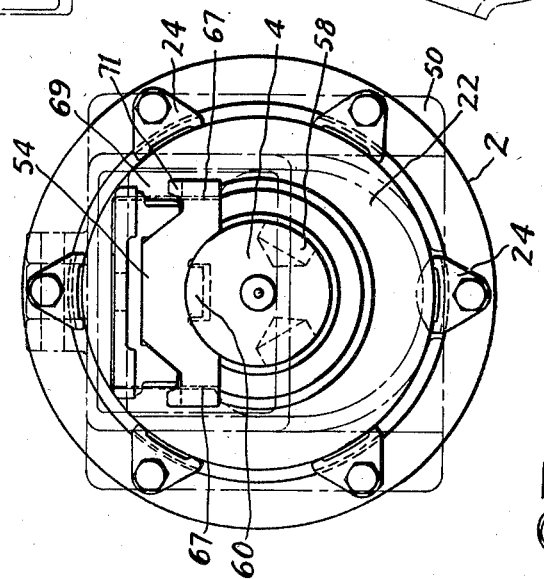
INVENTOR.
William C. Hedgcock
BY
ATTORNEYS.

May 3, 1938.  W. C. HEDGCOCK  2,115,989
ROLLER BEARING UNIT FOR FREIGHT CARS
Filed March 25, 1935   2 Sheets-Sheet 2
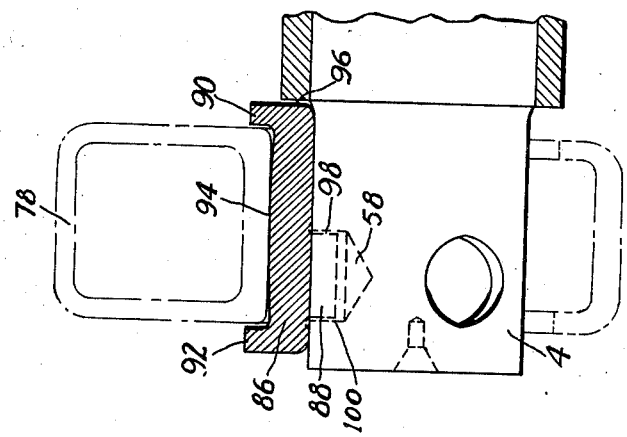
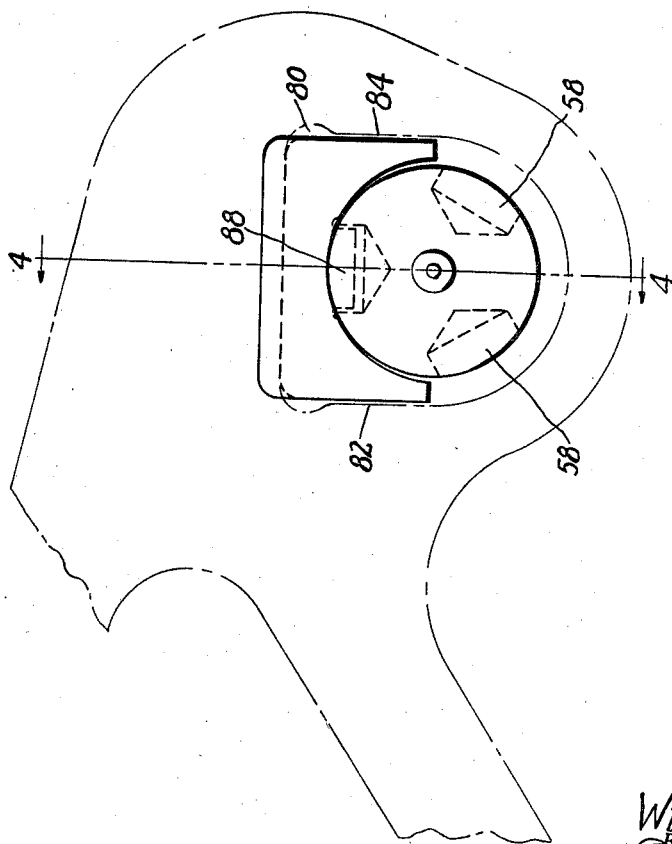
INVENTOR.
William C. Hedgcock.
BY
Orin O. B. Garner
ATTORNEYS.

Patented May 3, 1938

2,115,989

UNITED STATES PATENT OFFICE 2,115,989

ROLLER BEARING UNIT FOR FREIGHT CARS

William C. Hedgcock, Chicago, Ill., assignor to American Steel Foundries, Chicago, Ill., a corporation of New Jersey Application March 25, 1935, Serial No. 12,783

21 Claims. (Cl. 105—182)

This invention relates in general to railway wheel and axle assemblies of the roller bearing type. It concerns particularly a well known type of such an assembly having a nominally stationary inner axle and a rotating outer axle sleeved thereon, the wheels being mounted on the ends of the outer axle.

The object of this invention, broadly considered, is to provide a connection between such a wheel and axle assembly and a truck side frame which will be relatively simple in form and will facilitate application and removal of a roller bearing unit.

A particular object of the invention is to provide such a roller bearing wheel and axle assembly with a side frame connection which will enable the lateral thrusts to be transmitted in both directions at both ends of the wheel and axle assembly.

A further object is to provide such a connection between the truck frame member and the wheel and axle assembly as will absolutely prevent rotation of the nominally non-rotating inner axle and will at the same time permit the said inner axle to be rotated at will to present different wear surfaces.

A still further object of the invention is to produce such a connection between a roller bearing wheel and axle assembly and a truck frame as will avoid the necessity of providing for rotation of the inner axle at the ends where the load is received from the truck frame.

Another object comprehended in the invention is a connection between such a wheel and axle assembly and a truck frame as will be of material assistance in holding the truck frame square and in preventing spreading between the side frame members of the truck. This feature is particularly important in view of the present development toward spring plankless trucks since the spring plank has heretofore been commonly used to retain the side frames in a square relation with each other.

An additional object is to construct a relatively simple form of connection between such a roller bearing wheel and axle assembly and a truck frame which will meet all the requirements of service and at the same time simplify and economize the manufacturing processes.

Yet another object of this invention is to devise such a roller bearing wheel and axle assembly which may be installed in existing standard A. A. R. freight car trucks without modification of the present standard parts, that is, a wheel and axle assembly constructed in accordance with the present invention which shall be interchangeable with the present standard A. R. A. wheel and axle assembly for freight cars.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a sectional elevation of a roller bearing wheel and axle assembly embodying the invention and including in phantom lines the journal box portion of an associated truck side frame.

Only one-half of the assembly is shown, it being understood that the structure is bi-symmetrical in form;

Figure 2 is a fragmentary end elevation of the structure shown in Figure 1;

Figure 3 is a fragmentary top plan view in outline, showing the manner of cooperation between the journal box wedges and the novel axle bearer;

Figure 4 is a view similar to Figure 1 wherein the invention is embodied in a connection between the wheel and axle assembly and the truck frame member in a modified form; and Figure 5 is an end elevation of the structure shown in Figure 3.

Describing the structure more in detail and referring particularly to the embodiment shown in Figures 1, 2, and 3, the outer rotatable axle or housing 2 is sleeved over the inner nominally non-rotatable axle 4, the two being held in normal relative position by the bearing generally indicated at 6 interposed between them. The exact form of the bearing forms no part of this invention but is of a well known design consisting of an inner race or cone 8 secured on the inner axle, an outer race member or cup 10 pressed within the outer axle and abutting against the shoulder 12 thereof, and a series of rollers 14 therebetween, the cage 16 acting to maintain the rollers in their proper position relative to each other. The bell-shaped cavity 18 formed at the end of the outer axle 2 provides a lubricant chamber and access thereto is afforded by fittings 20 conveniently threaded in the outer axle. The cavity 18 may be sealed by the closure plate 22 which is held in position by a series of lugs 24 secured to the end of the outer axle 2 by the associated threaded bolts 26 and spring washers 28.

The closure plate 22 is a built up structure of novel form consisting of the outer portion 30 welded around its inner circumference as at 32 to the inner portion 34, and having its outer circumference fitted within the bearing cavity of the outer axle and resting upon the packing gasket 35 in abutment against the cup member 10. The inner circumference of the inner portion 34 closely surrounds the collar 36 which is pressed upon the inner axle in abutment against the cone 8 to secure the latter in position. The collar 36 has the annular groove 38 within which is received the snap ring 40. The snap ring 40 in combination with the closure plate 22 and the lubricant deflector 42 provides a labyrinth passage 44 which serves to prevent the egress of the lubricant and the ingress of extraneous matter. The wheels 46 may be pressed upon the outer housing in abutment against the annular shoulder 48 provided thereon.

The journal box 50, shown in phantom lines, is of standard A. A. R. design as is also the associated journal box wedge 52. The journal box 50 acts as a housing for the journal portion of the inner axle 4. Between the standard wedge 52 and the journal portion of the inner axle 4 I have provided a novel axle bearer 54 having a cylindrical bearing face 56 seated upon the journal portion of the axle 4. The journal portion of the axle 4 has an annular series of openings 58 within which may be selectively received the lug 60 integrally formed on the axle bearer 54. As shown the series consists of three openings but it will be understood that any desirable number may be used.

The lug 60 serves a duplicate purpose: first, it secures the axle 4 against rotation; and, second, it transmits lateral thrusts from the side frame to the axle 4. In the embodiment shown in Figures 1 to 3 a standard A. A. R. journal box and wedge is shown but in the embodiment shown in Figures 4 and 5 (hereinafter described in detail) the axle bearer serves as the sole means of connection between the side frame and the wheel and axle assembly.

In a roller bearing wheel and axle such as the one herein shown it is desirable to have uniform wear in the various portions of the bearing 6. If the axle 4 were maintained in one position at all times, wear would be concentrated upon that portion of the inner race or cone 8 which is immediately beneath the axle 4 since the vertical loads are transmitted through that area to the rollers, the outer race and the wheel to the rail. By the arrangement I have shown, the inner axle may be rotated through 120 degrees as frequently as necessary in order to equalize such wear.

An annular clearance groove 62 is formed on the axle bearer 54 and likewise an annular collar 64 against which the wedge member 52 may abut as at 66 to transmit lateral thrusts from the associated side frame. The edges of the axle bearer 54 are formed with the perpendicular faces 67 abutting laterally as at 65 against the brass lugs 69 formed on the inner faces of the journal box 50. The axle bearer 54 is provided at its outer end with the lateral shoulders or stops 71 which abut against the brass lug 69 as at 73 in the transmission of lateral thrusts from the truck frame to the wheel and axle assembly.

In the construction contemplated the journal box 50 is an integral part of the side frame structure, not otherwise shown, and the lug 68 is formed on the journal box in the standard manner as an abutment for the outer end of the standard wedge 52. The weight of the car body is transmitted through a load carrying member (not shown), the ends of which are commonly supported through springs resting upon the side frames, the latter acting as connecting members between the journal ends of the associated wheel and axle assemblies. The load is transmitted from the side frames to the journal ends of the wheel and axle assemblies through the medium of the journal box 50, the wedge member 52 and the axle bearer 54.

As viewed in Figure 1, assuming a thrust to the right is received by the side frame and its integral journal box 50, the thrust will be transmitted through the lugs 68 against the wedge 52 as at 70 and the wedge 52 will be driven against the axle bearer shoulder 64 and the axle bearer 54 will thrust against the collar 36 as at 72 and thus the thrust will be transmitted to the inner axle 4 of the wheel and axle assembly. At the same time, the lug 60 of the axle bearer 54 may thrust against the inner axle as at 74. Tolerances in dimensions which are a necessary feature of practical manufacturing might result in such a thrust being transmitted at 72 or at 74 or at both simultaneously, depending upon the actual conditions of fit which resulted when the parts were assembled. In any case, however, wear between the parts would soon result in simultaneous bearing at both these points.

Assuming that the thrust from the side frame were to the left as viewed in Figure 1, the brass lugs 69 on the inner faces of the journal boxes would abut against the shoulders or stops 71 of the axle bearer 54 as at 73 and the thrust would be transmitted from the axle bearer to the inner axle as at 76 through the medium of the lug 60. It will be understood, of course, that thrusts from the car body may be transmitted simultaneously through the side frames on both sides of the truck and therefore the thrust effects just described may take place at both ends of the wheel and axle assembly at practically the same time In the modification shown in Figures 4 and 5 I have shown a side frame 78 otherwise conventional but having a novel and very simple method of connection to the associated wheel and axle assembly. The side frame is formed with the journal opening 80 having the vertical guide surfaces 82 and 84 against which the novel form of axle bearer 86 may abut for the transmission of thrusts longitudinally of the truck between the side frame and the wheel and axle assembly. The end or bearing portion of the axle 4 projects through the opening 80 and is connected to the associated side frame by means of the axle bearer 86. The form of this end bearing portion of the axle 4 is the same as that shown in Figure 1 except that because of the simplicity of construction this end portion of the axle may be considerably shortened. It is provided, therefore, with the annular series of openings 58 within which may be received the lug 88 of the axle bearer 86. The side frame 78 is supported on the axle bearer 86 between the upright flanges 90 and 92 which transmit lateral thrusts in both directions between the side frame and the associated wheel and axle assembly. The top of the axle bearer 86 is slightly crowned as at 94 where the load of the side frame is imposed upon it in order to permit the slight vertical angling which is necessary between the side frame and the associated wheel and axle assembly. In the standard construction a similar effect is accomplished by providing a slight crown on the wedge.

In operation of the structure shown in Figures 4 and 5, lateral thrusts from the side frame 78 will be transmitted to the axle bearer 86 through the flanges 90 or 92 and thence to the axle 4 at the points 96 or 98 when the thrusts are in an inward direction or at 100 when the thrusts are in an outward direction.

It will be observed that in these structures I have provided a novel method of transmitting such thrusts between the car body and its associated wheel and axle assemblies. In addition, these constructions provide a means of connection between the side frames and this form of roller bearing wheel and axle assembly which makes it unnecessary to provide for wearing conditions between the ends of the inner axle and the associated side frames. A lubricant at this point may be done away with and a more economical operation effected, partly because of a saving in lubricant and partly because of the longer life of the parts when they are not subjected to frictional wear.

In the structure shown in Figures 4 and 5 I have greatly simplified the form of the side frame by eliminating entirely the journal box and providing a very simple form of connection between the side frame and its associated wheel and axle assembly.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a railway truck the combination of a truck side frame, a roller bearing wheel and axle assembly comprising a normally rotatable outer axle, wheels fixed on the ends thereof, a normally non-rotatable inner axle having a journal end, an annular series of openings in said journal end, an anti-friction bearing between said axles, a shrink ring on said inner axle preventing outward movement of said bearing, and a load transmitting member mounted on said journal end in abutment against said ring and comprising integral means received in one of said openings and securing said inner axle against rotation.

2. In a railway truck the combination of a truck side frame, a roller bearing wheel and axle assembly comprising a normally rotatable outer axle, wheels fixed on the ends thereof, a normally non-rotatable inner axle having a cylindrical end bearing with a plurality of openings therein, a shrink ring on said inner axle, an anti-friction bearing mounted on said inner axle and abutting outwardly against said ring, and a load transmitting member mounted on said end bearing in abutment against said ring, said member having projecting means selectively receivable in said openings to fix said inner axle against rotation.

3. In a railway truck, the combination of a truck side frame, a roller bearing wheel and axle assembly comprising a normally rotatable outer axle, wheels fixed on the ends thereof, a normally non-rotatable inner axle having a cylindrical end bearing, a plurality of dowel openings in said end bearing, a shrink ring on said inner axle, a roller bearing mounted on said inner axle, a load transmitting member mounted on said end bearing, said roller bearing and said member abutting against said ring in opposite directions, and said member having a dowel fitting within one of said openings.

4. In a railway truck, a side frame having a journal opening, an inner axle having a journal end projecting through said opening, an annular series of openings in said journal end, an outer axle sleeved over said inner axle, anti-friction bearings between said axles, and a journal bearer having means securing said journal end in said journal opening, said means being selectively receivable in said openings in said journal end.

5. In a railway truck a side frame having a journal aperture, a roller bearing wheel and axle assembly comprising an inner axle with an end bearing, a circumferential series of openings in said bearing, and an axle bearer securing said bearing within said aperture, said bearer having integral means selectively receivable in one of said openings.

6. In a railway truck a side frame having a journal aperture, a roller bearing wheel and axle assembly comprising an inner axle with an end bearing, a circumferential series of radial openings in said bearing and means securing said bearing in said aperture said means having an integral lug selectively receivable in one of said openings.

7. In a railway truck, the combination of a truck side frame, a roller bearing wheel and axle assembly comprising a normally rotatable outer axle, wheels fixed on the ends thereof, a normally non-rotatable inner axle having a cylindrical end bearing with a plurality of openings therein, a shrink ring on said inner axle, an anti-friction bearing mounted on said inner axle and abutting outwardly against said ring, and a load transmitting member mounted on said end bearing in abutment against said ring, said member having projecting means selectively receivable in said openings to fix the position of said inner axle and prevent rotation thereof.

8. In a railway truck, the combination of a side frame, a wheel and axle assembly including a shrink ring secured to an axle thereof, said axle having an end bearing with a series of openings therein, and a load transmitting member having a lug selectively receivable in said openings to prevent rotation of said axle, said load transmitting member acting through the medium of said lug to transmit lateral thrusts in both directions between said side frame and said wheel and axle assembly.

9. In a railway truck the combination of a side frame, a wheel and axle assembly including a shrink ring secured to an axle thereof, a load transmitting member having a lug keyed in said axle, an upstanding annular flange on its inner end, and a wedge member between said side frame and said load carrying member, said wedge and flange serving to transmit inward lateral thrusts from said side frame to said wheel and axle assembly, and said load transmitting member serving through the medium of said lug to transmit outward thrusts from said side frame to said wheel and axle assembly.

10. In a railway truck, the combination of a truck side frame, a roller bearing wheel and axle assembly comprising a normally rotatable outer axle, wheels fixed on the ends thereof, a normally non-rotatable inner axle having a cylindrical end bearing, a plurality of dowel openings in said end bearing, a shrink ring on said inner axle, a roller bearing mounted on said inner axle, a load transmitting member mounted on said end bearing, said roller bearing and said member abutting against said ring in opposite directions, and said member having means selectively receivable within said openings to fix the position of said inner axle.

11. In a railway truck, the combination of a truck side frame, a roller bearing wheel and axle assembly comprising a normally rotatable outer axle, wheels fixed on the ends thereof, a normally non-rotatable inner axle having a cylindrical end bearing, a plurality of dowel openings in said end bearing, a shrink ring on said inner axle, a roller bearing mounted on said inner axle, a load transmitting member mounted on said end bearing, said roller bearing and said member abutting against said ring in opposite directions, and said member having means selectively receivable within said openings to fix the position of rotation of said inner axle.

12. In a railway truck, the combination of a truck side frame, a roller bearing wheel and axle assembly comprising a normally rotatable outer axle, wheels fixed on the ends thereof, a normally non-rotatable inner axle having a cylindrical end bearing, a plurality of dowel openings in said end bearing, a shrink ring on said inner axle, a roller bearing mounted on said inner axle, a load transmitting member mounted on said end bearing, said roller bearing and said member abutting against said ring in opposite directions, and said member having means selectively receivable with said openings to fix the rotative position of said inner axle and to prevent rotation thereof when all of said truck parts are operatively assembled.

13. In a railway truck, the combination of a side frame having a journal box, a load transmitting member, a wedge member arranged to abut outwardly against said journal box and inwardly against said load transmitting member, a normally non-rotatable inner axle, a rotatable outer axle, wheels fixed on the ends of said rotatable outer axle, roller bearings between said axles, a shrink ring on said inner axle, said roller bearing and said load transmitting member abutting against said ring in opposite directions, said load transmitting member having means selectively keyed to said inner axle, said means serving to transmit lateral thrusts and to prevent rotation of said inner axle.

14. In a railway truck, the combination of a side frame, a wheel and axle assembly including a shrink ring secured to an axle thereof, said axle having an end bearing with a series of openings therein, and a load transmitting member having a lug selectively receivable in said openings, said load transmitting member acting through the medium of said lug to transmit lateral thrusts in both directions between said side frame and said wheel and axle assembly.

15. In a railway car truck the combination of a side frame, a wheel and axle assembly including an inner normally non-rotatable axle having an end bearing with a series of radial openings therein, positioning means on said axle inwardly of said end bearing, and a load transmitting member positioned on said axle in abutment against said means, said load transmitting member having integral means selectively receivable in said openings for positioning said axle.

16. In a railway truck the combination of a side frame, a roller bearing wheel and axle assembly comprising a normally non-rotatable inner axle having a cylindrical end bearing with a plurality of openings therein, positioning means secured on said axle, an anti-friction bearing mounted on said axle, and a load transmitting member mounted on said end bearing and having means cooperating with one of said openings to fix the rotative position of said axle, said anti-friction bearing and said member abutting said means in opposite directions and transmitting thrusts thereto.

17. In a railway truck the combination of a side frame having a journal aperture, a roller bearing wheel and axle assembly comprising a normally non-rotatable inner axle having a cylindrical end bearing with a plurality of openings therein, positioning means secured on said axle, an anti-friction bearing mounted on said axle, and a load transmitting member mounted on said end bearing, said member having integral means cooperating with one of said openings and securing said axle within said aperture in any one of a plurality of predetermined positions of rotation.

18. In a railway truck the combination of a side frame having a journal aperture, a roller bearing wheel and axle assembly comprising a normally non-rotatable inner axle having a cylindrical end bearing with a plurality of openings therein, positioning means secured on said axle, an anti-friction bearing mounted on said axle. and a load transmitting member mounted on said end bearing, said member having integral means receivable within any one of said openings for positioning said axle in any one of a plurality of predetermined positions, and said member transmitting lateral thrust in both directions between said side frame and said axle.

19. In a railway truck the combination of a truck side frame, a roller bearing wheel and axle assembly comprising a normally rotatable outer axle, a normally non-rotatable inner axle having a journal end, an annular series of openings in said journal end, and a load transmitting member mounted on said journal end and having integral means received in one of said openings and selectively positioning said inner axle against rotation in any one of a plurality of predetermined positions, said load transmitting member transmitting all vertical and lateral thrusts between said side frame and said axle.

20. In a railway car truck the combination of a truck side frame, a roller bearing wheel and axle assembly comprising a normally rotatable outer axle, a normally non-rotatable inner axle having a journal end with an annular series of openings therein, an anti-friction bearing between said axles, positioning means secured on said inner axle inwardly of said journal end, and a load transmitting member mounted on said journal end and having an integrally formed lug selectively receivable in any one of said openings for positioning said inner axle in predetermined positions of rotation, said bearing and said member abutting said positioning means in opposite directions.

21. In a railway truck a side frame having a journal aperture, a wheel and axle assembly comprising a normally rotatable outer axle and a normally non-rotating inner axle with an end bearing, a series of openings in said bearing, and an axle bearer securing said bearing within said aperture, said bearer having integral means received in one of said openings.

WILLIAM C. HEDGCOCK.